(12) United States Patent
Boertjes et al.

(10) Patent No.: US 8,958,696 B2
(45) Date of Patent: Feb. 17, 2015

(54) COHERENT AUGMENTED OPTICAL ADD-DROP MULTIPLEXER

(75) Inventors: David Boertjes, Nepean (CA); Kim B. Roberts, Nepean (CA); Maurice O'Sullivan, Ottawa (CA); Giuseppe Bordogna, Ottawa (CA)

(73) Assignee: Ciena Corporation, Hanover, MD (US)

( * ) Notice: Subject to any disclaimer, the term of this patent is extended or adjusted under 35 U.S.C. 154(b) by 551 days.

(21) Appl. No.: 13/124,443

(22) PCT Filed: Oct. 15, 2009

(86) PCT No.: PCT/CA2009/001455
§ 371 (c)(1),
(2), (4) Date: Apr. 15, 2011

(87) PCT Pub. No.: WO2010/043035
PCT Pub. Date: Apr. 22, 2010

(65) Prior Publication Data
US 2011/0268442 A1 Nov. 3, 2011

Related U.S. Application Data

(60) Provisional application No. 61/106,264, filed on Oct. 17, 2008.

(51) Int. Cl.
H04J 14/02 (2006.01)
H04J 14/00 (2006.01)
H04Q 11/00 (2006.01)

(52) U.S. Cl.
CPC ........ *H04Q 11/0005* (2013.01); *H04J 14/0206* (2013.01); *H04J 14/0209* (2013.01);
(Continued)

(58) Field of Classification Search
CPC .................... H04Q 11/005; H04Q 2011/0015; H04Q 2011/0016
USPC ............................................................ 398/83
See application file for complete search history.

(56) References Cited

U.S. PATENT DOCUMENTS 5,438,445 A 8/1995 Nakano
7,184,666 B1 * 2/2007 Li et al. ........................... 398/83
(Continued)

FOREIGN PATENT DOCUMENTS

WO 2006114435 11/2006
WO 2008112202 9/2008

OTHER PUBLICATIONS

Chung et al; multicast technology using WSS based multi-degree ROADM; 2008; IEICE; pp. 1-2.*
(Continued)

*Primary Examiner* — Ken Vanderpuye
*Assistant Examiner* — Amritbir Sandhu
(74) *Attorney, Agent, or Firm* — Kent Daniels; Daniels IP Services Ltd

(57) ABSTRACT

In an Optical Add-Drop Multiplexer, a drop section comprises a Wavelength Selective Switch (WSS) having at least one drop-port, the WSS being operative to couple a respective set of w (where w>1) wavelength channels from a received Wavelength Division Multiplexed (WDM) signal to each drop port. A respective 1:s power splitter is associated with each drop port. Each power splitter supplies the respective set of channels received from its drop port to each one of a corresponding set of coherent receivers. Each coherent receiver operates to receive a selected one of the respective set of channels.

14 Claims, 4 Drawing Sheets

(52) U.S. Cl.
CPC ........... *H04J14/021* (2013.01); *H04J 14/0212* (2013.01); *H04J 14/0213* (2013.01); *H04J 14/0217* (2013.01); *H04Q 2011/0015* (2013.01); *H04Q 2011/0016* (2013.01)
USPC ................................. 398/83; 398/79; 398/48

(56) References Cited

U.S. PATENT DOCUMENTS

| | | | |
|---|---|---|---|
| 7,269,356 B2* | 9/2007 | Winzer ........................ | 398/135 |
| 7,629,356 B2* | 12/2009 | Chessari et al. ............. | 514/300 |
| 7,751,714 B2* | 7/2010 | Zhong et al. ................. | 398/83 |
| 2003/0235363 A1* | 12/2003 | Pfeiffer ........................ | 385/16 |
| 2004/0023631 A1* | 2/2004 | Deutsch et al. .............. | 455/283 |
| 2005/0281295 A1* | 12/2005 | Fishman et al. ............. | 370/535 |
| 2006/0245766 A1* | 11/2006 | Taylor .......................... | 398/208 |
| 2007/0160372 A1* | 7/2007 | Eberlein et al. .............. | 398/83 |
| 2008/0038001 A1* | 2/2008 | Becker et al. ................ | 398/204 |
| 2008/0181605 A1* | 7/2008 | Palacharla et al. ........... | 398/50 |
| 2008/0232800 A1* | 9/2008 | Jensen ........................... | 398/48 |
| 2009/0232497 A1* | 9/2009 | Archambault et al. ........ | 398/50 |
| 2010/0086306 A1* | 4/2010 | D'Alessandro et al. ....... | 398/79 |
| 2011/0222854 A1* | 9/2011 | Roberts et al. ................. | 398/70 |
| 2011/0262143 A1* | 10/2011 | Ji et al. .......................... | 398/83 |
| 2011/0268442 A1* | 11/2011 | Boertjes et al. ................ | 398/48 |
| 2011/0286746 A1* | 11/2011 | Ji et al. .......................... | 398/83 |
| 2012/0076507 A1* | 3/2012 | Roberts et al. ................ | 398/205 |
| 2012/0121267 A1* | 5/2012 | Wang et al. .................... | 398/83 |
| 2012/0219293 A1* | 8/2012 | Boertjes et al. ................ | 398/48 |
| 2012/0237212 A1* | 9/2012 | Nishihara et al. ............. | 398/26 |
| 2012/0294618 A1* | 11/2012 | Yu et al. ......................... | 398/83 |
| 2013/0071124 A1* | 3/2013 | Xie et al. ........................ | 398/82 |
| 2013/0209020 A1* | 8/2013 | Doerr et al. ..................... | 385/2 |
| 2013/0294784 A1* | 11/2013 | Suzuki ............................ | 398/208 |
| 2014/0161454 A1* | 6/2014 | Roorda ........................... | 398/68 |

OTHER PUBLICATIONS

Lei Zong et al; A novel tunable Demux/Mux Solution for WSS-Based ROADM and WXC Nodes; 2005; optical society of America.*
Zong et al; a novel tunable DeMUX/MUX solution for WSS-Based ROADM and WXC Nodes; 2007; optical society of America.*
Chung et al; Multicast Technology using WSS based Multi-dgreee ROADM; 2008; IEICE; pp. 1-2.*
Vasilyev, et al., Transparent ultra-long-haul DWDM networks with "broadcast-and-select" OADM/OXC architecture, Journal of Lightwave Technology, vol. 21 No. 11, Nov. 2003, pp. 2661-2672.
Boskovic, et al., Broadcast and select OADM nodes application and performance trade-offs, Optical Fiber Communication Conference and Exhibit, 2002 OFC 2002 Mar. 17-22, 2002, pp. 158-159 ISBN: 1-55752-701-6.
Supplementary European Search Report issued on Applicant's Co-Pending European Patent Application No. 09820149 issued Jun. 27, 2012.
Zami T., et al., "Driving technologies addressing the future dynamic of transparent core networks" Transparent Optical Networks 2008 ICTON 2008. 10th Anniversary International Conference on IEEE Piscataway, N.J. USA, Jun. 22, 2008, pp. 194-197.
Lei, Zhong, et al., "A Novel Tunable DeMUX/MUX Solution for WSS-Based ROADM and WXC Nodes", Optical Fiber Communications Conference and Exposition National Fiber Optic Engineers Conference, OFCNFOEC 2007, Mar. 25-29, 2007, pp. 1-7.

* cited by examiner

COHERENT AUGMENTED OPTICAL ADD-DROP MULTIPLEXER

CROSS-REFERENCE TO RELATED APPLICATIONS

This is the first application filed in respect of the present invention.

MICROFICHE APPENDIX

Not Applicable.

TECHNICAL FIELD

The present invention relates to optical communications networks, and in particular to coherent augmented optical add-drop multiplexer.

BACKGROUND

Prior to the reintroduction of coherent optical transmitters and receivers, a colourless Optical Add-Drop Multiplexer (OADM) could be constructed as shown in FIG. 1. In the system of FIG. 1, the OADM 2 is divided into a Drop section 4 and an Add section 6, both of which is constructed around a respective Wavelength-Selective Switch (WSS) 8, 10. In the Drop section 4, the Drop-WSS 8 receives an in-bound Wavelength Division Multiplexed (WDM) signal comprising a set of n parallel wavelength channels from an upstream optical fibre medium 12. The Drop-WSS 8 operates to separate selected channels from the in-bound WDM signal and direct each selected channel to a respective port 14 of the Drop-WSS 8. Consequently, each port 14 outputs a single channel extracted from the in-bound WDM signal. Typically, each port 14 is designated as either a drop port 14d, or a pass-through (or express) port 14e. Each drop port 14d is connected to a respective receiver (Rx) 16 which receives the corresponding optical channel in a conventional manner. Each express port 14e is connected to downstream optical equipment such as, for example, the Add section of the same (or a different) OADM 2. Among other things, this functionality can be used to support branching in an optical mesh network.

The Add section 6 of the OADM 2 operates in a manner that is effectively the reciprocal of the Drop section 4. Thus, the Add-WSS 10 is provided with a set of ports 18, which are designated as either Add-ports 18a or express ports 18e. Each Add-port 18a is connected to a transmitter (Tx) 20, which generates a respective optical channel signal in a conventional manner. Each express port 18e receives a respective optical channel signal from upstream optical equipments such as, for example, the Drop-section 4 of the same (or a different) OADM 2. In each case, the Add-WSS 10 operates to add the channels received through each port 18 into an outbound WDM signal which is launched into a downstream optical fibre medium 22.

One of the problems with the arrangement of FIG. 1 is that conventional WSS components have a limited number of ports 14, 18. Typically, commercially available WSS devices are configured with up to p=9 ports, which must be shared between express ports and drop-ports (in the Drop section) or Add-ports (in the Add-section). WSS components with up to p=20 ports have been demonstrated and may become commercially available in the future. However, increasing the number of ports also tends to increase the cost of the WSS component.

Typical optical transmission systems have between n=32 and n=88 channels. A typical requirement for an OADM node in a network is to be capable of adding/dropping up to 50% of the channels of the WDM signal. In a mesh network, there is also a further requirement for a specified degree of branching to support mesh connectivity. Typically, between 4 and 8 degree branching is required. However, 4-degree branching requires that 3 of the WSS ports be allocated as express ports. In a 9-port WSS component, these leaves only 6 ports available for use as add/drop-ports. If the optical transmission system is designed with an 88 channel capacity, the 6 available add/drop ports represents only a 7% add/drop capacity, which is far below the desired value of 50%.

FIG. 2 is a block diagram schematically illustrating a coherent selection OADM 24 known in the prior art.

As may be seen in FIG. 2, the drop section 26 of a Coherent selection OADM 24 uses a drop-section power splitter 28 to couple an inbound n-channel WDM signal from an upstream optical fibre medium 12 into a plurality of output ports 30. As in the direct attach OADM 2 described above with reference to FIG. 1, the output ports 30 are divided between drop ports 30d and express ports 30e. However, unlike the OADM 2 of FIG. 1, each output port 30 receives energy from all of the channels of the inbound n-channel WDM signal. A coherent receiver (cRx) 32 coupled to each drop port 30d operates to "tune-in" and receive a desired channel from the WDM signal. Because all of the channels of the re-channel WDM signal are output through every port 30 of the drop-section power splitter 28, it is necessary to remove dropped channels from the WDM signal in order to enable channel reuse. This can be achieved by use of a Wavelength Blocker (WB) 34 for 2-connected nodes, or a WSS (not shown) for mesh connected nodes.

The Add section 36 of the OADM 24 operates in a manner that is effectively the reciprocal of the Drop section 26. Thus, an Add-Section power combiner 38 is provided with a set of ports 40, which are designated as either Add-ports 40a or express ports 40e. Each Add-port 40a is connected to a tuneable transmitter (Tx) 42, which generates a respective optical channel signal centered on a desired carrier wavelength, in manner known in the art. Each express port 40e receives a respective WDM optical signal from upstream optical equipments such as, for example, the Drop-section 26 of the same (or a different) OADM 24. In each case, the Add-Section power combiner 38 operates to add the channels received through each port 40 into an outbound WDM signal which is launched into the downstream optical fibre medium 22.

There are two main drawbacks with this approach. The first is increased loss. The large number of drop channels which must be supported drives high port count power splitters and combiners. These devices are used because they are not frequency selective, but as a result have high intrinsic loss. This drives additional cost in amplification and the associated noise increase which limits system performance. This limit eventually limits the number of channels that can be dropped.

The second issue relates to the performance of the coherent transmitters and receivers. In particular, the drop section is inherently non-selective, which means that all of the channels of the inbound WDM signal are presented to each coherent receiver 32. This means that each coherent receiver 32 must be capable of selecting and receiving one channel of interest, while substantially rejecting all of the other channels. The ability of the receiver 32 to perform this function is related to the common mode rejection ratio (CMRR) of the receiver, which drives considerable complexity and cost.

In practice, the additional loss, complexity, and cost of accommodating this solution effectively limit either the number of channels which can be dropped, or the system capacity, or both.

Techniques which overcome at least some of the limitations of the above-noted prior art remain highly desirable.

SUMMARY OF THE INVENTION

An aspect of the present invention provides, in an Optical Add-Drop Multiplexer, a drop section which comprises a Wavelength Selective Switch (WSS) having at least one drop-port, the WSS being operative to couple a respective set of w (where w>1) wavelength channels from a received Wavelength Division Multiplexed (WDM) signal to each drop port. A respective 1:w power splitter is associated with each drop port. Each power splitter supplies the respective set of channels received from its drop port to each one of a corresponding set of coherent receivers. Each coherent receiver operates to receive a selected one of the respective set of channels.

A further aspect of the present invention provides, in an Optical Add-Drop Multiplexer, an Add section which comprises a Wavelength Selective Switch (WSS) having at least one Add-port, the WSS being operative to couple a respective set of w (where w>1) wavelength channels from each Add-port to an out-bound Wavelength Division Multiplexed (WDM). A respective w:1 power combiner is associated with each Add-port. A respective set of w (where w>1) transmitters optically coupled to each power combiner, and generates a corresponding wavelength channel signal. Each power combiner is operative to combine the optical channel signals from each of its respective set of transmitters, and to supply the corresponding set of wavelength channels to its associated Add-port of the WSS.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

The present invention provides methods and systems in which a moderate port count Wavelength Selective Switch (WSS) and a plurality of moderate Common Mode Rejection Ratio (CMRR) coherent receivers are used in combination to achieve a high drop-ratio Optical Add-Drop Multiplexer (OADM). Embodiments of the present invention are described below, by way of example only, with reference to FIG. 3.

Figure 3A:
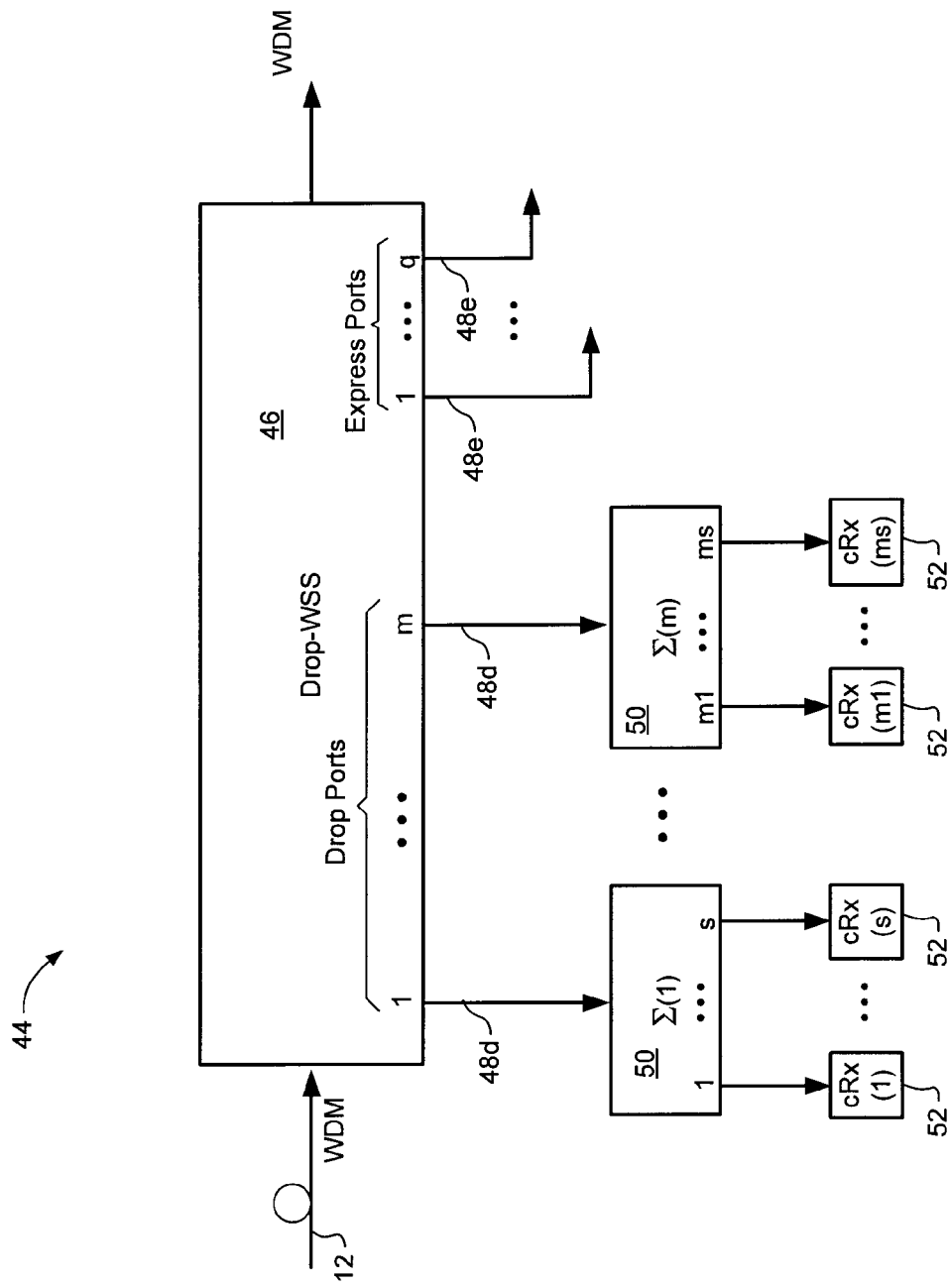
FIGS. 3a and 3b are block diagrams schematically illustrating principal elements and operation of a coherent augmented OADM in accordance with an embodiment of the present invention.

FIG. 3a is a block diagram schematically illustrating a drop section 44 of a representative coherent augmented OADM in accordance with an aspect of the present invention. In the embodiment of FIG. 3, an n-channel Wavelength Division Multiplexed (WDM) signal is input to a drop section WSS 46 having a set of p ports 48, which are allocated between q (where q≥0) express ports 48e and m (where m=p−q) drop ports 48d.

As is known in the art, a WSS is capable of routing any given channel from the input WDM signal to any one of the ports 48. In the embodiment of FIG. 3a, this functionality is leveraged to control the drop section WSS 46 such that a respective set of w (where w>1) wavelength channels are supplied to each drop port 48d. The number of wavelength channels supplied to any given Drop port 48d may be the same, or different from the number of wavelength channels supplied to another one of the Drop ports. A 1:s power splitter 50 (where s>1) connected to each drop port 48d then supplies the respective set of channels to each one of a corresponding set of s coherent receivers (cRx) 52. In some embodiments, s≥w, but this is not essential.

In some embodiments, the drop section WSS 46 may be a conventional WSS. If desired, the WDM signal may be formatted to conform with a standard spectral grid, for example an ITU-T grid having a 50 GHz channel spacing, but this is not essential. In some embodiments, the WDM signal may have between n=32 and n=88 wavelength channels, and the WSS 46 may have p=9 ports 48, but these values are not essential. The number (m) of drop ports 48d, and the number (q) of express ports can be selected as appropriate. For example, in a mesh network node requiring 6-degree branching, a set of q=5 express ports 48e would be needed, leaving m=4 ports available for use as drop ports 48d.

Preferably, each coherent receiver (cRx) 52 is tuneable, so that it can receive a wavelength channel signal centered an a desired carrier wavelength (or frequency). In some embodiments in which tuneable coherent receivers are used, the frequency range of each receiver 52 may be wide enough to enable the receiver 52 to tune in any channel of the WDM signal. In other embodiments, the dynamic range of each receiver 52 may be wide enough to enable the receiver 52 to tune in any one of a subset of channels of the WDM signal. In still other embodiments, each receiver 52 may be non-tuneable.

Figure 1:
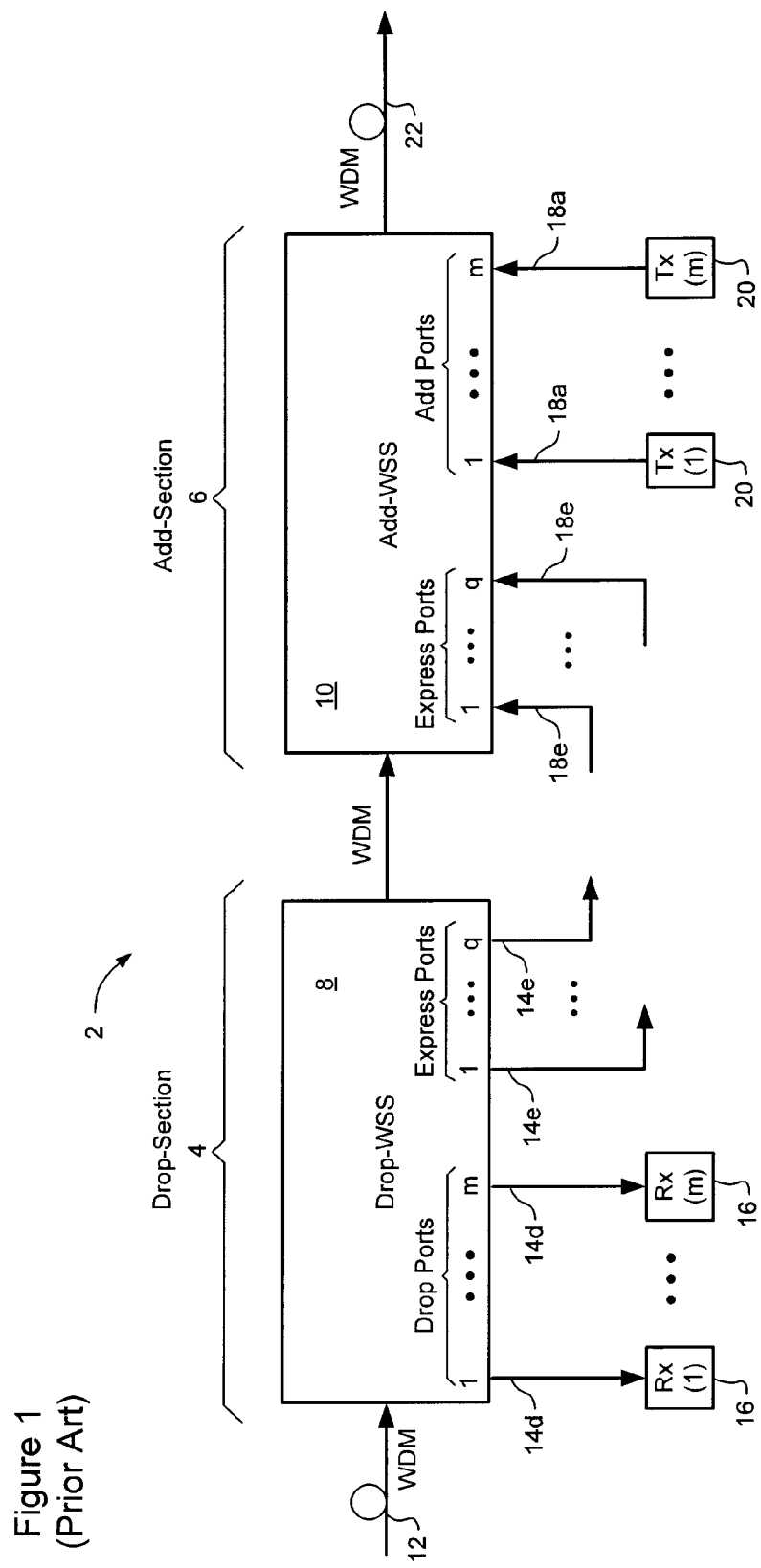
FIG. 1 is a block diagram schematically illustrating principal elements and operation of a direct attach OADM known in the prior art.
Figure 2:
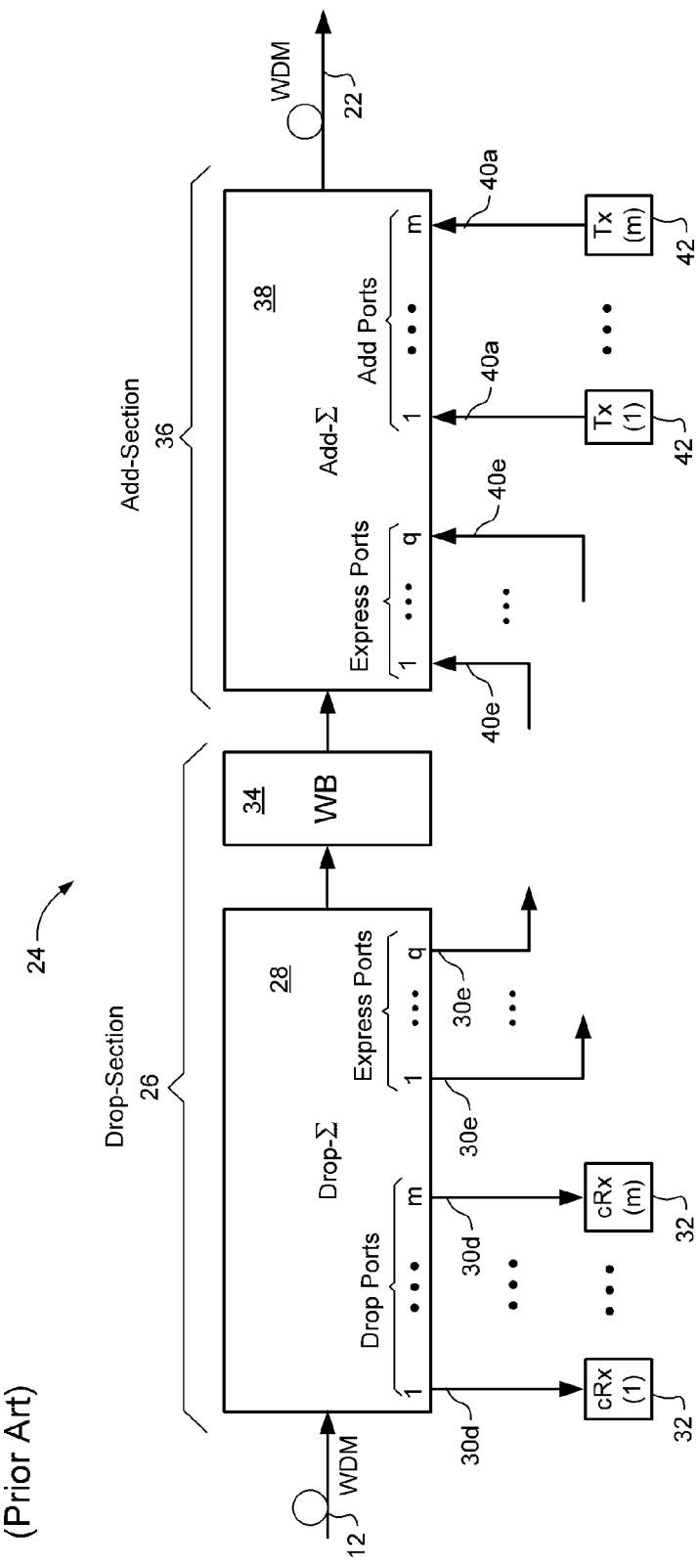
FIG. 2 is a block diagram schematically illustrating principal elements and operation of a full coherent selection OADM, known in the prior art.

With the arrangement of FIG. 3a, each coherent receiver 52 must be designed having a CMRR which enables the receiver 52 to tune in and receive a selected one channel while rejecting each of the other w−1 channels presented to it. Because w<n, the CMRR requirement for the coherent receivers 52 is significantly lower than that which would be required in the prior art system describe above with reference to FIG. 2. This relaxed CMRR requirement means that lower cost coherent receivers can be used, as compared to the prior art system of FIG. 2. However, it will be seen that, even with the lower CMRR of each receiver 52, a total drop count of d=m*w is achieved. For example, consider a network system in which the WDM signal has n=88 wavelength channels, and the WSS has m=6 drop ports, each of which receives a respective set of w=8 channels. In this case, the total drop count is d=6*8=48 channels, which is equivalent to a drop ratio of about 55%.

Figure 3B:
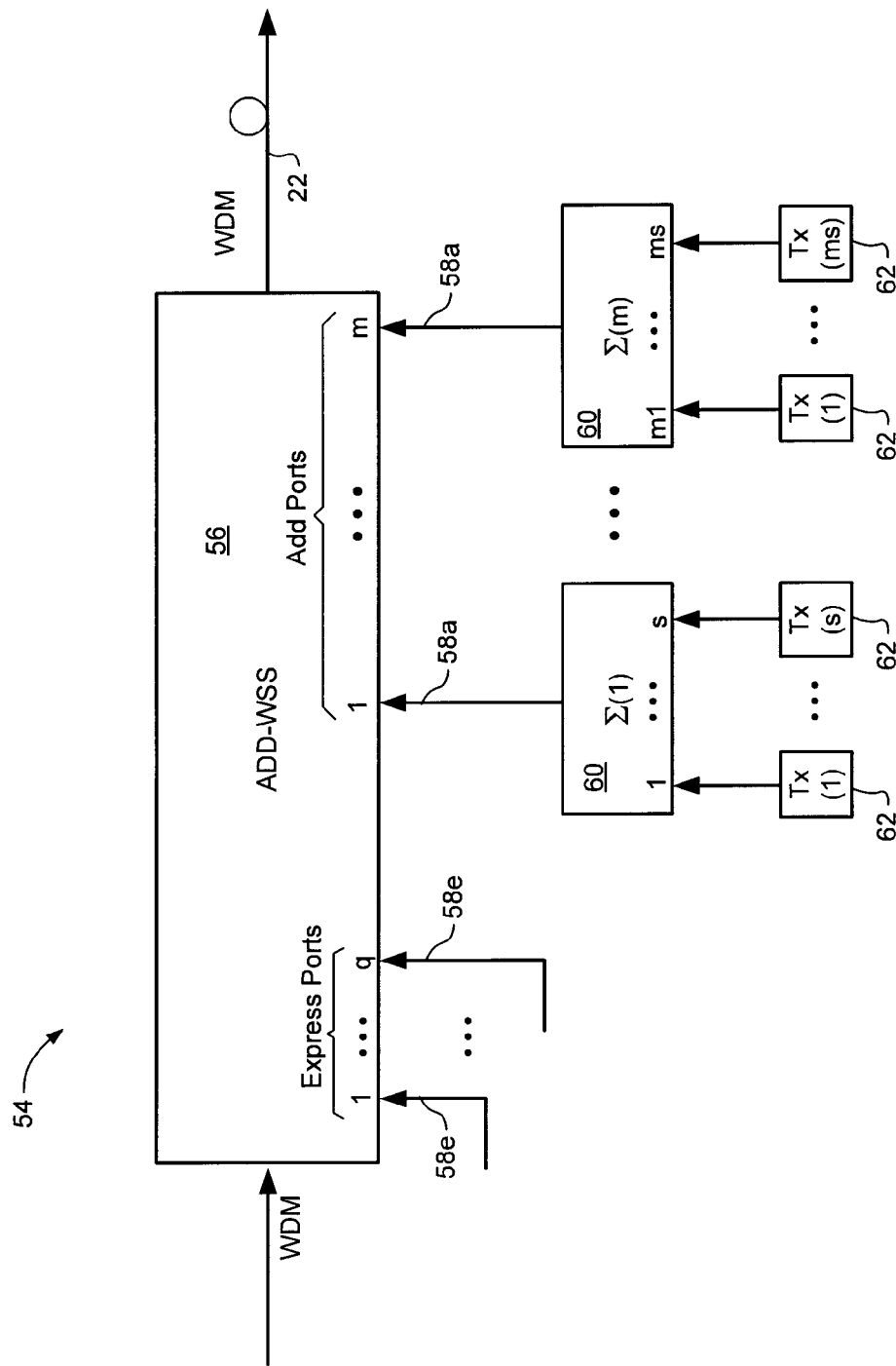

FIG. 3b is a block diagram schematically illustrating an Add section 54 of a representative coherent augmented OADM in accordance with an aspect of the present invention. In the embodiment of FIG. 3b, the Add section 54 of the OADM operates in a manner that is effectively the reciprocal of the Drop section 44 of FIG. 3b. Thus, an Add-Section WSS 56 is provided with a set of ports 58, which are designated as either Add-ports 58a or express ports 58e. The Add-Section WSS 56 operates to add the channels received through each port 40 into an outbound WDM signal which is launched into the downstream optical fibre medium 22. Each express port 40*e* receives a respective WDM optical signal from upstream optical equipment such as, for example, the Drop-section 44 of the same (or a different) OADM. Each Add-port 58*a* is connected to an s:1 power combiner 60 (where s>1) which combines the channel signals generated by a respective set of transmitters (Tx) 62. Some or all of the transmitters connected to a given power combiner 60 may be operating at any given time, so each Add port 58*a* will receive a respective set of w (where w≤s) wavelength channels. The number of wavelength channels received by any given Add port 58*a* may be the same, or different from the number of wavelength channels received by another one of the Add ports. With this arrangement, the total number of transmitters that can be supported is t=m*s. For example, consider a network system having a capacity of n=88 wavelength channels, and the Add-section WSS 56 has m=6 add ports, each of which is coupled to a power combiner 60 that supports a respective set of s=8 transmitters. In a case where all of the transmitters are generating a respective wavelength channel, each Add port will receive a set of w=s=8 channels, and the total add count is t=6*8=48 channels, which is equivalent to a add ratio of about 55%.

Preferably, each transmitter (Tx) 62 is tuneable, so that it can generate a wavelength channel signal centered an a desired carrier wavelength (or frequency). In some embodiments in which tuneable transmitters are used, the dynamic range of each transmitter (Tx) 62 may be wide enough to enable the transmitter (Tx) 62 to generate any channel of the WDM signal. In other embodiments, the dynamic range of each transmitter (Tx) 62 may be wide enough to enable the transmitter (Tx) 62 to generate any one of a subset of channels of the WDM signal. In still other embodiments, each transmitter (Tx) 62 may be non-tuneable.

The embodiments of the invention described herein are intended to be illustrative only. References to specific devices or equipment sold by Nortel Networks Limited, or others) are therefore the be considered as examples only, and shall not be considered as limiting the scope of the invention, which is therefore intended to be limited solely by the scope of the appended claims.

We claim:

1. An Optical Add-Drop Multiplexer, comprising:
    a drop section comprising:
        a drop section Wavelength Selective Switch (WSS) having at least one drop-port, the drop section WSS being operative to supply a set of w (where w is an integer, w>1) drop wavelength channels from a received Wavelength Division Multiplexed (WDM) signal to the drop port, the received WDM signal comprising n (where n is an integer, n>w) wavelength channels;
        a respective 1:s (where s is an integer, s>1) power splitter associated with each drop port, each power splitter configured to supply the respective set of drop wavelength channels received from its drop port to each one of a set of s output ports; and
        a coherent receiver connected to an output port of one of the 1:s power splitters, the coherent receiver having a Common Mode Rejection Ratio (CMRR) that is selected such that
            the coherent receiver can reject w−1 of the set of drop wavelength channels presented to it, and
            the CMRR is less than that required to enable the coherent receiver to reject n−1 channels of the received WDM signal.

2. The Optical Add-Drop Multiplexer as claimed in claim 1, wherein each coherent receiver is tuneable to receive the selected one of the respective set of drop wavelength channels centered on a selected carrier wavelength.

3. The Optical Add-Drop Multiplexer as claimed in claim 1, wherein s≥w.

4. The Optical Add-Drop Multiplexer as claimed in claim 1, wherein a number of drop wavelength channels supplied to a first one of the Drop ports is the same as the number of drop wavelength channels supplied to another one of the Drop ports.

5. The Optical Add-Drop Multiplexer as claimed in claim 1, wherein a number of drop wavelength channels supplied to a first one of the Drop ports is different from the number of drop wavelength channels supplied to another one of the Drop ports.

6. The Optical Add-Drop Multiplexer as claimed in claim 1 wherein each coherent receiver is non-tunable.

7. The Optical Add-Drop Multiplexer as claimed in claim 1, further comprising:
    an Add section including
        an add section Wavelength Selective Switch (WSS) having at least one Add-port, the add section WSS being operative to supply a respective set of add wavelength channels from each Add-port to an out-bound Wavelength Division Multiplexed (WDM) signal,
        a respective s:1 (where s>1) power combiner associated with each Add-port, and
        a set of one or more transmitters optically coupled to each power combiner, each transmitter generating a respective optical channel signal corresponding to a selected one of the set of add wavelength channels;
        wherein each power combiner is operative to combine the optical channel signals from each one of its respective set of transmitters, and to supply the combined set of add wavelength channels to its associated Add-port of the WSS.

8. The Optical Add-Drop Multiplexer as claimed in claim 7, wherein each power combiner supplies a set of add wavelength channels to its associated Add port.

9. The Optical Add-Drop Multiplexer as claimed in claim 8, wherein a number of add wavelength channels supplied to a first one of the Add ports is the same as the number of add wavelength channels supplied to another one of the Add ports.

10. The Optical Add-Drop Multiplexer as claimed in claim 8, wherein a number of add wavelength channels supplied to a first one of the Add ports is different from the number of add wavelength channels supplied to another one of the Add ports.

11. The Optical Add-Drop Multiplexer as claimed in claim 7, wherein each transmitter is tuneable to generate its corresponding optical channel signal centered on a selected carrier wavelength.

12. The Optical Add-Drop Multiplexer as claimed in claim 2 wherein a dynamic range of each tuneable coherent receiver is selected such that the coherent receiver can tune in any one of a subset of channels of the WDM signal.

13. The Optical Add-Drop Multiplexer as claimed in claim 7, wherein:
    the drop section WSS comprises at least one drop section express port, and is operative to couple a respective set of express wavelength channels from the received WDM signal to each drop section express port; and
    the add section WSS comprises a respective add section express port optically connected to each drop section express port, and is operative to couple the respective set of express wavelength channels received through any given add section express port to the out-bound WDM signal;

such that the express wavelength channels are coupled through the Optical Add-Drop Multiplexer without blocking.

14. The Optical Add-Drop Multiplexer as claimed in claim 7, wherein at least one drop wavelength channel corresponds with one of the add wavelength channels.

\* \* \* \* \*